United States Patent
Selén et al.

(10) Patent No.: US 9,686,666 B2
(45) Date of Patent: Jun. 20, 2017

(54) METHOD AND ARRANGEMENT FOR HANDLING D2D COMMUNICATION

(71) Applicant: Telefonaktiebolaget L M Ericsson (publ), Stockholm (SE)

(72) Inventors: Yngve Selén, Uppsala (SE); Reihaneh Malekafzaliardakani, Sollentuna (SE); Johan Rune, Lidingö (SE); Joachim Sachs, Sollentuna (SE); Leif Wilhelmsson, Dalby (SE)

(73) Assignee: Telefonktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/428,877

(22) PCT Filed: Sep. 17, 2012

(86) PCT No.: PCT/SE2012/050981
§ 371 (c)(1),
(2) Date: Mar. 17, 2015

(87) PCT Pub. No.: WO2014/042568
PCT Pub. Date: Mar. 20, 2014

(65) Prior Publication Data
US 2015/0237491 A1    Aug. 20, 2015

(51) Int. Cl.
*H04W 8/00* (2009.01)
*H04W 76/02* (2009.01)
(Continued)

(52) U.S. Cl.
CPC ....... *H04W 8/005* (2013.01); *H04W 72/0453* (2013.01); *H04W 76/023* (2013.01); *H04W 72/082* (2013.01); *H04W 92/18* (2013.01)

(58) Field of Classification Search
CPC ............. H04W 8/005; H04W 72/0453; H04W 76/023; H04W 72/082; H04W 76/02;
(Continued)

(56) References Cited

U.S. PATENT DOCUMENTS

| 7,039,445 B1 | 5/2006 | Yoshizawa |
| 8,060,105 B2 | 11/2011 | Jung et al. |

(Continued)

FOREIGN PATENT DOCUMENTS

| WO | 2008034023 A1 | 3/2008 |
| WO | 2009138820 A1 | 11/2009 |

(Continued)

OTHER PUBLICATIONS

Fodor, Gábor et al., "Design Aspects of Network Assisted Device-to-Device Communications," IEEE Communications Magazine, vol. 50, Issue 3, Mar. 2012, IEEE, pp. 170-177.
(Continued)

*Primary Examiner* — Hirdepal Singh
(74) *Attorney, Agent, or Firm* — Withrow & Terranova, PLLC

(57) ABSTRACT

A method in a first wireless device for handling Device to Device, D2D, communication between the first wireless device and a second wireless device is provided. The first wireless device sends a beacon signal to be received by the second wireless device. The beacon signal announces that the first wireless device is available for D2D communication. The beacon signal is sent on a first channel where the first wireless device is interfered. The beacon signal indicates that no response to the beacon signal shall be sent on the first channel.

32 Claims, 4 Drawing Sheets

(51) Int. Cl.
*H04W 72/04* (2009.01)
*H04W 72/08* (2009.01)
*H04W 92/18* (2009.01)

(58) Field of Classification Search
CPC ....... H04W 92/18; H04W 48/16; H04W 4/02; H04W 84/18; H04W 88/06; H04W 12/06; H04W 40/22; H04W 48/20; H04W 4/008; H04W 52/243
USPC ......................................................... 455/450
See application file for complete search history.

(56) References Cited

U.S. PATENT DOCUMENTS

| | | | |
|---|---|---|---|
| 8,081,575 | B2 | 12/2011 | Habetha |
| 8,804,590 | B2 | 8/2014 | Nakae et al. |
| 9,319,931 | B2 | 4/2016 | Lim et al. |
| 2003/0100343 | A1 | 5/2003 | Zourntos et al. |
| 2005/0247775 | A1 | 11/2005 | Gloekler et al. |
| 2006/0253736 | A1 | 11/2006 | Rudolf et al. |
| 2007/0049317 | A1 | 3/2007 | Qi et al. |
| 2007/0147317 | A1 | 6/2007 | Smith et al. |
| 2007/0274275 | A1 | 11/2007 | Laroia et al. |
| 2008/0069033 | A1 | 3/2008 | Li et al. |
| 2008/0137577 | A1 | 6/2008 | Habetha |
| 2008/0205340 | A1 | 8/2008 | Meylan et al. |
| 2009/0017861 | A1 | 1/2009 | Wu et al. |
| 2009/0203388 | A1 | 8/2009 | Karaoguz |
| 2009/0323648 | A1 | 12/2009 | Park et al. |
| 2010/0093364 | A1 | 4/2010 | Ribeiro et al. |
| 2010/0202400 | A1 | 8/2010 | Richardson et al. |
| 2011/0170431 | A1 | 7/2011 | Palanki et al. |
| 2011/0176523 | A1 | 7/2011 | Huang et al. |
| 2011/0258313 | A1 | 10/2011 | Mallik et al. |
| 2011/0268101 | A1 | 11/2011 | Wang et al. |
| 2011/0317569 | A1 | 12/2011 | Kneckt et al. |
| 2012/0163263 | A1 | 6/2012 | Oh et al. |
| 2012/0207100 | A1 | 8/2012 | Hakola et al. |
| 2012/0213075 | A1 | 8/2012 | Koie et al. |
| 2012/0250636 | A1 | 10/2012 | Wang et al. |
| 2012/0265818 | A1 | 10/2012 | Van Phan et al. |
| 2013/0028177 | A1 | 1/2013 | Koskela et al. |
| 2013/0059583 | A1* | 3/2013 | Van Phan et al. ......... 455/435.1 |
| 2013/0083661 | A1 | 4/2013 | Gupta et al. |
| 2013/0115967 | A1 | 5/2013 | Soliman et al. |
| 2013/0163491 | A1 | 6/2013 | Singh et al. |
| 2013/0170470 | A1* | 7/2013 | Kneckt ............. H04W 72/0446 370/330 |
| 2013/0178221 | A1 | 7/2013 | Jung et al. |
| 2013/0195026 | A1 | 8/2013 | Johnsson et al. |
| 2013/0195036 | A1* | 8/2013 | Quan ................... H04W 72/04 370/329 |
| 2013/0212219 | A1 | 8/2013 | Koskela et al. |
| 2013/0235813 | A1* | 9/2013 | Segev ................. H04W 72/044 370/329 |
| 2013/0242840 | A1* | 9/2013 | Tolhuizen et al. ............ 370/311 |
| 2013/0267269 | A1 | 10/2013 | Fang et al. |
| 2013/0279381 | A1 | 10/2013 | Sampath et al. |
| 2013/0316762 | A1 | 11/2013 | Charbit et al. |
| 2014/0066058 | A1* | 3/2014 | Yu ........................... H04L 67/16 455/434 |
| 2014/0171062 | A1 | 6/2014 | Fallgren et al. |
| 2014/0215594 | A1* | 7/2014 | Lambert ........................... 726/7 |
| 2014/0219095 | A1 | 8/2014 | Lim et al. |
| 2014/0226639 | A1 | 8/2014 | Yi et al. |
| 2014/0370904 | A1* | 12/2014 | Smith ................... H04W 8/005 455/450 |
| 2015/0131571 | A1 | 5/2015 | Fodor et al. |
| 2015/0237663 | A1 | 8/2015 | Wilhelmsson et al. |

FOREIGN PATENT DOCUMENTS

| | | |
|---|---|---|
| WO | 2011063845 A1 | 6/2011 |
| WO | 2011130630 A1 | 10/2011 |
| WO | 2012035367 A1 | 3/2012 |
| WO | 2012069956 A1 | 5/2012 |
| WO | 2014042568 A1 | 3/2014 |

OTHER PUBLICATIONS

International Search Report and Written Opinion for PCT/SE2012/051144, mailed Feb. 26, 2013, 13 pages.

International Search Report and Written Opinion for PCT/SE2012/050983, mailed Mar. 12, 2013, 13 pages.

Eljack, Sarah et al., "Synchronized Multi-Channel Cognitive MAC protocol with Efficient Solutions for Second Spectrum Access," Symposia and Workshops on Ubiquitous, Autonomic and Trusted Computing, IEEE, 2009, 5 pages.

Ke, Yi et al., "MCR-MAC: Multi-channel Cognitive Radio MAC Protocol for Cooperative Incumbent System Protection in Wireless Ad-hoc Network," First International Conference on Ubiquitous and Future Networks, IEEE, 2009, 6 pages.

International Search Report and Written Opinion for PCT/SE2012/050981, mailed Jun. 14, 2013, 12 pages.

Baccelli, Francois, et al., "On the Design of Device-to-Device Autonomous Discovery," Fourth International Conference on Communication Systems and Networks (COMSNETS), Jan. 3-7, 2012, Bangalore, India, IEEE, 9 pages.

Doppler, Klaus, et al., "Advances in D2D Communications: Energy efficient Service and Device Discovery Radio," 2nd International Conference on Wireless Communication, Vehicular Technology, Information Theory and Aerospace & Electronic Systems Technology (Wireless VITAE), Feb. 28-Mar. 3, 2011, Chennai, India, IEEE, 6 pages.

Doppler, Klaus, et al., "Device-to-Device Communication as an Underlay to LTE-Advanced Networks," IEEE Communications Magazine, vol. 47, Issue 12, Dec. 2009, IEEE, pp. 42-49.

Drula, Catalin, et al., "Adaptive Energy Conserving Algorithms for Neighbor Discovery in Opportunistic Bluetooth Networks," IEEE Journal on Selected Areas in Communication, vol. 25, Issue 1, Jan. 2007, IEEE, pp. 96-107.

Zhang, Lei, et al., "Neighbor Discovery in Wireless Networks Using Compressed Sensing with Reed-Muller Codes," International Symposium of Modeling and Optimization of Mobile, Ad Hoc, and Wireless Networks, May 9-13, 2011, Princeton, New Jersey, IEEE, pp. 154-160.

Non-Final Office Action for U.S. Appl. No. 14/408,200, mailed Jan. 20, 2016, 36 pages.

Author Unknown, "A New Regulatory and Technical Environment for Wireless Broadband: A Primer on the IEEE 802.11y Amendment," Wi-Fi Alliance Discussion Paper, www.wi-fidev.org/knowledge_center_overview.php?docid=4570, Oct. 2008, Wi-Fi Alliance, pp. 1-7.

Herrera, Moisés, et al., "Performance Study of Non-beaconed and Beacon-Enabled Modes in IEEE 802.15.4 Under Bluetooth Interference," The Second International Conference on Mobile Ubiquitous Computing, Systems, Services and Technologies (UBICOMM), Sep. 29-Oct. 4, 2008, IEEE Computer Society, pp. 144-149.

Final Office Action for U.S. Appl. No. 14/408,200, mailed Aug. 9, 2016, 34 pages.

Corrected Notice of Allowability for U.S. Appl. No. 14/408,200, mailed Mar. 28, 2017, 14 pages.

Non-Final Office Action for U.S. Appl. No. 14/424,709, mailed Mar. 29, 2017, 14 pages.

* cited by examiner

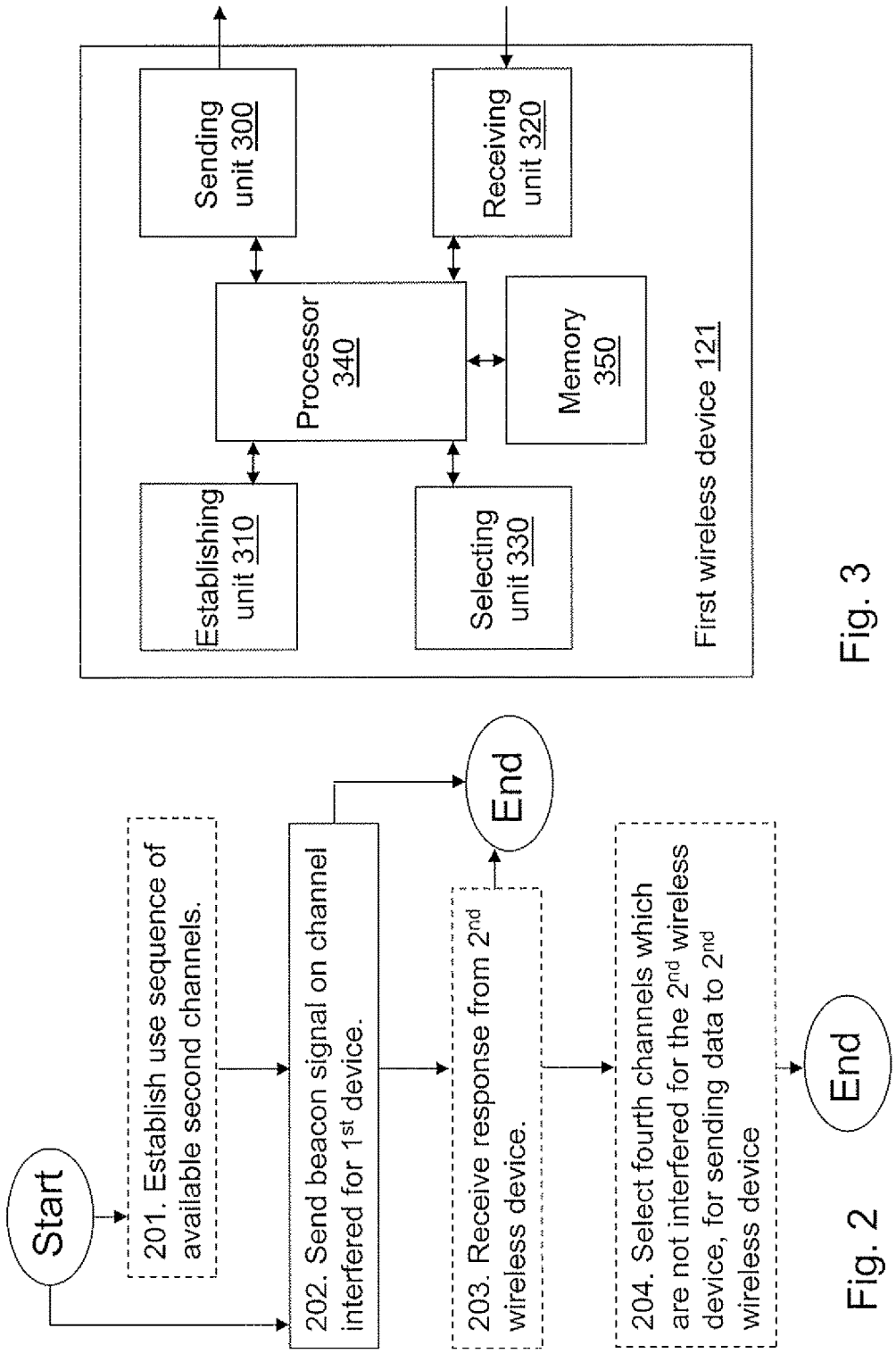

METHOD AND ARRANGEMENT FOR HANDLING D2D COMMUNICATION

This application is a 35 U.S.C. §371 national phase filing of International Application No. PCT/SE2012/050981, filed Sep. 17, 2012, the disclosure of which is incorporated herein by reference in its entirety.

TECHNICAL FIELD

Embodiments herein relate to a first wireless device, a second wireless device and methods therein. In particular, it relates to handling Device to Device D2D communication.

BACKGROUND

Communication devices such as wireless devices are also known as e.g. User Equipments (UEs) terminals, mobile terminals, wireless terminals and/or mobile stations.

Wireless devices are enabled to communicate wirelessly in a wireless communications networks.

Wireless device may further be referred to as mobile telephones, cellular telephones, laptops, or surf tablets with wireless capability, just to mention some further examples. The wireless devices in the present context may be, for example, portable, pocket-storable, hand-held, computer-comprised, or vehicle-mounted mobile devices, enabled to communicate voice and/or data, with another entity, such as another device or a server. Also other wireless device types related to the Internet are relevant in this context, e.g., copying machines, printers, vehicles, home appliances, etc. It may be envisaged a large number of devices that benefit from wireless connectivity which are traditionally not seen as wireless communication devices.

D2D Communication

Device discovery is a well-known and widely used component of many existing wireless technologies, including ad hoc and cellular networks. Examples comprise Bluetooth, several variants of the IEEE 802.11 standards suite, such as WiFi Direct. The key technique used by these standards is to use specially designed beacon signals that devices broadcast so that nearby devices can detect the proximity of such beacon broadcasting devices. After having detected each other the devices may, if desired, initiate a communication session. This is typically done in a direct Device-to-Device (D2D) fashion, where the devices transmit data through direct signaling between each other. Alternatively, such a communication session could be performed through a network, e.g., a WCDMA, LTE or 802.11 network.

D2D communication often takes place in unlicensed spectrum, e.g., the Industrial, Scientific and Medical (ISM) band at 2.4 GHz. Such a band is typically divided in a number of channels, and the devices would typically not beacon or communicate over all channels simultaneously. Similarly, other devices typically use parts of the full band, i.e. a number of channels, such that different parts of the band experience different interference scenarios. E.g., a few channels of a band are interfered for a device, and a few other channels are not interfered for the same device. In this document an interfered channel for a device refers to a channel at which the received energy from signals not of interest to the device exceeds a certain threshold during a time interval.

WO2011/063845 shows a way of performing beacon signal broadcasting. The solution comprises selecting by a node capable of entering a D2D communication, a beacon channel for broadcasting such that the occurrence of collisions on the selection of the beacon channel is avoided. The beacon signal is then broadcasted on the selected channel.

In the unlicensed bands the transmit power is limited to a comparatively low value, as compared to wide area systems. Hence, devices that are relatively close to each other may experience different interference scenarios. It may be so that two devices that are close enough for initiating a D2D communication are interfered on different channels, respectively. It may even be so that there is no single channel available at which both devices experience an interference free situation.

It should be realized that embodiments herein are not limited to unlicensed bands or bands with low power. The above examples are given for illustrative purposes, and the similar interference scenarios may be valid in other bands using other typical power levels.

SUMMARY

It is therefore an object of embodiments herein to provide a way of improving the way of initiating a D2D communication between wireless devices.

According to a first aspect of embodiments herein, the object is achieved by a method in a first wireless device for handling Device to Device, D2D, communication between the first wireless device and a second wireless device. The first wireless device sends (202) a beacon signal to be received by the second wireless device. The beacon signal announces that the first wireless device is available for D2D communication. The beacon signal is sent on a first channel where the first wireless device is interfered. The beacon signal indicates that no response to the beacon signal shall be sent on the first channel.

According to a second aspect of embodiments herein, the object is achieved by a method in a second wireless device for handling Device to Device, D2D, communication between a first wireless device and the second wireless device. The second wireless device receives a beacon signal from the first wireless device. The beacon signal announces that the first wireless device is available for D2D communication. The beacon signal is received on a first channel where the first wireless device is interfered. The beacon signal indicates that no response to the beacon signal shall be sent on the first channel.

According to a third aspect of embodiments herein, the object is achieved by a first wireless device for handling Device to Device, D2D, communication between the first wireless device and a second wireless device. The first wireless device comprises a sending unit configured to send a beacon signal to be received by the second wireless device. The beacon signal announces that the first wireless device is available for D2D communication. The beacon signal is sent on a first channel where the first wireless device is interfered. The beacon signal indicates that no response to the beacon signal shall be sent on the first channel.

According to a fourth aspect of embodiments herein, the object is achieved by second wireless device for handling Device to Device, D2D, communication between a first wireless device and the second wireless device. The second wireless device comprises a receiving unit configured to receive a beacon signal from the first wireless device. The beacon signal announces that the first wireless device is available for D2D. communication. The beacon signal is received on a first channel where the first wireless device is interfered. The beacon signal indicates that no response to the beacon signal shall be sent on the first channel.

The beacon signal is received on a first channel where the first wireless device is interfered. Since the beacon signal indicates that no response to the beacon signal shall be sent on the first channel, the first channel can be used for beacon signals despite being interfered for the first wireless device, because no one will send a beacon response on that channel. This results in potentially a lot more channels available for beacon signalling since also these interfered channels may be used which cannot be used by prior art solutions. For this reason, the way of initiating a D2D communication between wireless devices has been improved.

An advantage of embodiments herein is that beacon signaling is enabled in a situation where there is no single channel available for at least two devices at which they are both "interference free" or subject to low amounts of interference.

BRIEF DESCRIPTION OF THE DRAWINGS

Examples of embodiments herein are described in more detail with reference to attached drawings in which:

FIG. 2 is a flowchart depicting embodiments of a method in a first wireless device.

FIG. 3 is a schematic block diagram illustrating embodiments of a first wireless device.

DETAILED DESCRIPTION

According to embodiments herein, a new type of beacon is introduced that indicates "I'm available; do not respond to me on this channel", and that may indicate "because I am interfered". This may be combined with the typical beacon that indicates "I'm available; do respond to me on this channel".

Figure 1:
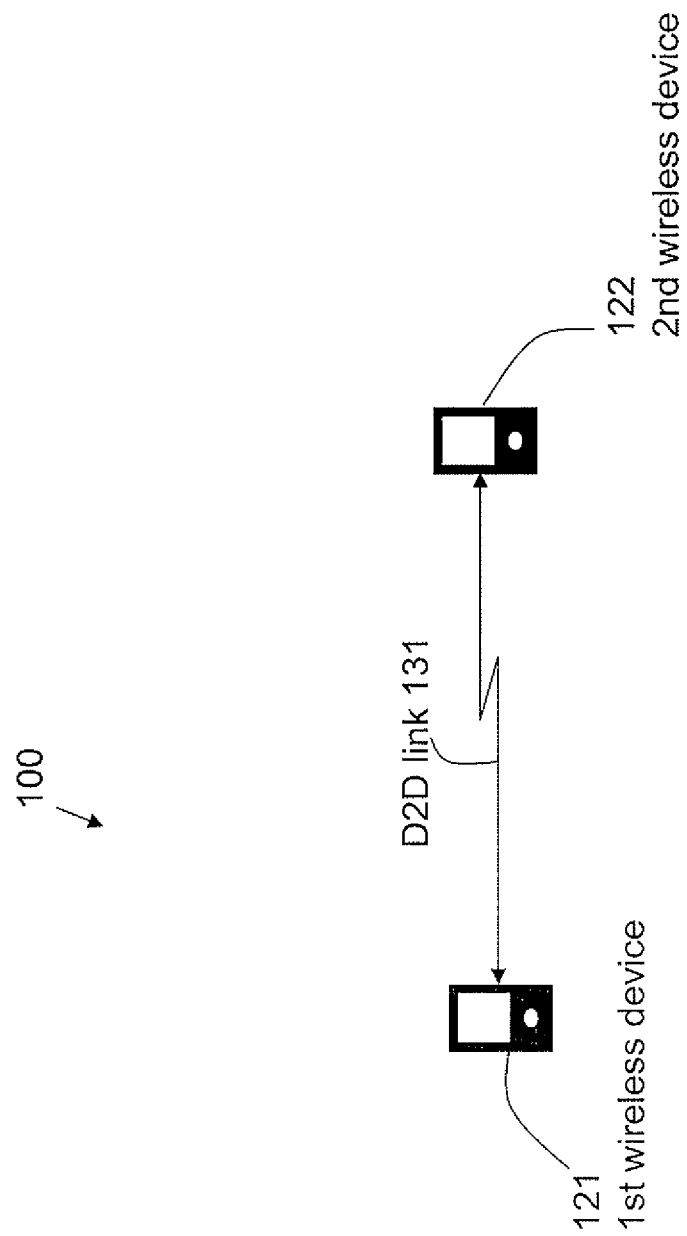
FIG. 1 is a schematic block diagram illustrating a communications network.

FIG. 1 depicts a communications network 100 in which embodiments herein may be implemented. The communications network 100 may for example be a 802.11 WLAN network, a Bluetooth network or a 802.15 Zigbee network. In some embodiments the communications network 100 may be a wireless communication network such as an LTE (e.g. LTE FDD, LTE TDD, LTE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, Wireless Local Area Network (WLAN) or any network or system.

A number of wireless devices are located in the communications network 100. In the example scenario of FIG. 1, only two wireless devices are shown. One of them is a first wireless device 121. Further, one or more second wireless devices 122 are located in the cellular communications network 100, whereof one second wireless device 122 is shown in FIG. 1. In some embodiments, the first wireless device 121 and the second wireless device 122 are both capable to communicate using D2D communication. The term "D2D communication" shall be interpreted in a wide sence. In some embodiments, a regular type of WLAN application where beaconing according to embodiments herein may be considered. In these embodiments, the first wireless device 121 or the second wireless device is a Base transceiver Station (BTS)-type device, i.e. a WLAN access point. The term "D2D communication" also includes the communication between a wireless device and a WLAN access point. The first wireless device 121 may e.g. communicate with the second wireless device 122 using D2D communication over a D2D link 131 or any other suitable link.

The first wireless device 121 and the second wireless device 122 may e.g. be mobile terminals or wireless terminals, mobile phones, computers such as e.g. laptops, Personal Digital Assistants (PDAs) or tablet computers, sometimes referred to as surf tablets, with wireless capability, Machine to Machine (M2M) devices or any other radio network units capable to communicate over a radio link in a communications network.

In D2D communication wireless devices need to find each other in order to be able to communicate. This may be done either with network support, or purely based on communications between the devices as according to embodiments herein. The embodiments herein may also be used with some network support. E.g., a network may encourage a device to perform beacon signal on a channel. The beaconing is then still purely comprised in a D2D scenario, but the network may be involved in triggering it.

Wireless devices such as the first wireless device 121 and the second wireless device 122 in FIG. 1, attempt to discover wireless devices in a local range for e.g. communication or that can provide a given type of service. The first wireless device 121 may make use of some D2D technology and broadcasts a beacon signal over a beacon channel, not shown, which may be received by a peer such as the second wireless device 122, thereby enabling device discovery. There may be multiple D2D technologies in operation which may carry a beacon signal. Possible options include 802.11 WLAN, Bluetooth, or a possible future D2D extension of LTE, or other technologies such as wireless sensor technologies.

Embodiments herein enables beacon signaling in a situation where there is no single channel available for at least two devices at which they are both interference free or subject to low amounts of interference. Imagine the following example scenario: The first wireless device 121 is seeing interference only on channel 1 and the second wireless device 122 is seeing interference only on channel 2; channel 1 and 2 are the only channels available, and the first and second wireless device 121, 122 would like to be discoverable to each other. If the first wireless device 121 sends its beacon signals on its non-interfered channel 2 this is not decodable to the second wireless device 122 since it is interfered on channel 2, and vice-versa. If the first wireless device 121 instead sends a "dirty beacon" on channel 1, i.e., the channel where it sees interference, this can be received by the second wireless device 122 since there is no interference for the second wireless device 122 on that channel, and vice-versa. Please note that "dirty beacon" here means to send a beacon signal on a channel that is interfered for the beacon sending device.

Embodiments herein are also applicable in channel bonding situations, where multiple channels are used simultaneously to achieve a higher bandwidth, or the use of wider channels which only rather late entered the 802.11 family of standards or the LTE standard. E.g., beacon signals may be sent on multiple channels simultaneously, alternatively, beaconing may be performed in some order on different channels, and then it is beneficial to determine at what channels a wireless device is seeing interference such that the appropriate channels may be bonded for wide bandwidth high throughput communication.

Example of embodiments of a method in first wireless device 121 for handling Device to Device, D2D, communication between the first wireless device 121 and a second wireless device 122, will now be described with reference to a flowchart depicted in FIG. 2. Here the method is discussed seen from the perspective of the first device 121. In an example scenario the first wireless device 121 wishes to discover a wireless device such as the second device 122 for D2D communication. Therefore the first wireless device 121 intend to send a beacon signal that is to be discovered by the second device 122 and assist the second wireless device 122 to find the first wireless device 121. The method comprises the following actions, which actions may be taken in any suitable order. Dashed lines of some boxes in FIG. 2 indicate that this action is not mandatory.

Action 201

This is an optional action in which one or more second channels which are not interfered for the first wireless device 121 are established. These one or more second channels may be indicated in a beacon signal to be sent on a first channel in Action 202 below. The one or more second channels are available for the second wireless device 122 to respond to the first wireless device 121 when it has sent the beacon signal. In some embodiments the first wireless device 121 establishes a use sequence of the one or more available second channels. This use sequence would indicate a sequence of the channels that the second wireless 122 device may send its response message on. Typically, a certain time interval would be associated to each channel in the sequence, e.g., if the second wireless device 122 wants to respond on the first channel in the sequence, it would do so during a time interval T1, if it would like to respond on the second channel in the sequence, it would do so during a time interval T2, and so on. The first device 121 may then listen for response messages during the appropriate time intervals for the respective channels. Please note that the expression "interference free channel" or "a channel free of interference" in this document also includes a channel with low amounts of interference. The respective response instances, i.e. the second channels and their associated time intervals, in the use sequence may be established based on a common time reference such as a GPS clock, a common time reference in the communications network, or a time from first sending beacon between the first wireless device 121 and the second wireless device 122. This would enable the first wireless device 121 to listen on the right channel at the appropriate time to receive the response message of the second wireless device 122.

Action 202

In this action the first wireless device 121 sends a beacon signal. The beacon signal is to be received by the second wireless device 122. The beacon signal announces that the first wireless device 121 is available for D2D communication. In the example scenario there are no channels available that are free from interference for the first wireless device 121 to use for sending a beacon signal on. Therefore or by other reasons, the beacon signal is sent on a first channel where the first wireless device 121 is interfered. As mentioned above, an interfered channel for a device is a channel at which the level of received energy by unwanted signals for the device during a time period is above a threshold value, where that threshold value is set such that the received unwanted energy would cause significant problems for the device to decode wanted signals on the same channel. To prevent the second wireless device 122 from using the interfered first channel on which the beacon was sent, for responding to the beacon signal, the beacon signal indicates that no response to the beacon signal shall be sent on the first channel.

To further assist the second wireless device 122 to find a suitable channel to respond on, the beacon signal may further indicate one or more second channels which are not interfered for the first wireless device 121. The one or more second channels are available for the second wireless device 122 from the perspective of the first wireless device 121 to respond to the first wireless device 121 sending the beacon signal. An available channel here means a channel that is not interfered for the first wireless device 121.

In some embodiments the beacon signal further indicates the established use sequence of the available one or more second channels that the channels should be responded on. The use sequence was established in Action 201 above.

As an alternative or combined with the above embodiments, the beacon signal may further indicate one or more third channels which are interfered for the first wireless device 121. The one or more third channels shall not be used by the second wireless device 122 for responding to the first wireless device 121 sending the beacon signal. In these embodiments, the second wireless device 122 is informed of the one or more third channels that are interfered by the first device 121. The second wireless device 122 may then simply avoid the interfered third channels and select another channel, i.e. one or more second channels, to use for responding to the beacon signal on. The first channel may be part of the set of third channels.

Action 203

This Action is optional. The first wireless device 121 may then receive on one or more of the second channels, a response to the beacon signal from the second wireless device 122. In embodiments where multi-channel systems are used more than one channel may be used to transmit and receive a response. The one or more second channels are not interfered for the first wireless device 121. The response indicates that the second wireless device 122 is available for D2D communication with the first wireless device 121. This may be indicated implicitly by the response itself; the second wireless device 122 would only respond if it is actually available for communication. It may also be explicitly signalled, by setting a flag, e.g., "availability for D2D communication", in the response message to the first wireless device 121.

To further assist the first wireless device 121 to find a suitable channel to send data or control information on, the response may further indicate one or more fourth channels which are not interfered for the second wireless device 122. The one or more fourth channels shall be used by the first wireless device 121 to send data or control information to the second wireless device 122 during the D2D communication. Note that in some embodiments the data may be sent on the same channel as the beacon signal was sent, i.e. the first channel. In embodiments where multi-channel systems are used more than one channel are used to transmit and receive data.

Further, in some embodiments, the response indicates one or more fifth channels which are interfered for the second wireless device 122. In these embodiments, the first wireless device 121 is informed of the one or more fifth channels that are interfered by the second device 122. The first wireless device 121 may then simply avoid the interfered fifth channels and select one or more other channels, i.e. one or more fourth channels, to use for sending data on. This is performed in Action 204 below.

Action 204

This Action is optional. The first wireless device 110 may, select one or more fourth channels based on the received response indicating the one or more fifth interfered channels. The one or more fourth channels are selected to not be interfered for the second wireless device 122. The one or more fourth channels shall be used by the first wireless device 121 to send data or control information to the second wireless device 122 using D2D communication.

In this way the one or more fourth channel may be interfered for the first wireless device 121 but shall be used by the first wireless device 121 to transmit data to the second wireless device 122 during the D2D communication.

As mentioned in some embodiments above, the first wireless device 121 and the second wireless device 122 may include some sort of channel map in the beacon signal or in the response to the beacon signal, indicating "I'm available, these are the channels at which I'm not seeing much interference. E.g., for 8 channels, the channel map may be a binary sequence, e.g., [1 1 0 0 0 1 0 0] meaning that interference is seen on channel number 1, 2 and 6 in the sequence and communication and/or beacon signaling towards the transmitting wireless device of the first wireless device 121 and the second wireless device 122 should be done at the other channels. Optionally, there may be a fixed sequence for what order the available channels should be responded on; this sequence may depend on a common time reference between the transmitting and potentially responding devices. This information is used to, at a later stage, to identify channels for communication. Then the first wireless device 121 may transmit data on a channel at which itself is interfered, but not its intended receiver, the second wireless device.

To perform the method actions for handling D2D communication between the first wireless device 121 and the second wireless device 122, the first wireless device 121 comprises the following arrangement depicted in FIG. 3.

The first wireless device 121 comprises a sending unit 300 configured to send a beacon signal to be received by the second wireless device 122. The beacon signal announces that the first wireless device 121 is available for D2D communication. The beacon signal is sent on the first channel where the first wireless device 121 is interfered. The beacon signal indicates that no response to the beacon signal shall be sent on the first channel.

In some embodiments the beacon signal further indicates one or more second channels which are not interfered for the first wireless device 121. The one or more second channels are available for the second wireless device 122 to respond to the first wireless device 121 sending the beacon signal.

The first wireless device 121 may further comprise an establishing unit 310 configured establish a use sequence of the available one or more second channels. The respective response instances in the use sequence may be arranged to be established based on a common time reference between the first wireless device 121 and the second wireless device 122.

The beacon signal may further be arranged to indicate the established use sequence of the available one or more second channels that the channels should be responded on.

In some embodiments, the beacon signal further is arranged to indicate one or more third channels which are interfered for the first wireless device 121. The one or more third channels shall not be used by the second wireless device 122 for responding to the first wireless device 121 sending the beacon signal.

The first wireless device 121 may further comprise a receiving unit 320 configured to receive on one or more second channels, a response to the beacon signal from the second wireless device 122. The one or more second channels are not interfered for the first wireless device. The response may indicate that the second wireless device 122 is available for D2D communication with the first wireless device 121.

The response may further be arranged to indicate one or more fourth channels which are not interfered for the second wireless device 122. The one or more fourth channels shall be used by the first wireless device 121 to send data or control information to the second wireless device 122 during the D2D communication.

In some embodiments the response is arranged to indicate one or more fifth channels which are interfered for the second wireless device 122.

The first wireless device 121 may further comprise a selecting unit 330 configured to select, based on the received response indicating the one or more fifth interfered channels, one or more fourth channels which are not interfered for the second wireless device 122. The one or more fourth channels shall be used by the first wireless device 121 to send data or control information to the second wireless device 122 using D2D communication.

The fourth channel may be interfered for the first wireless device 121 but shall be used by the first wireless device 121 to transmit data to the second wireless device 122 during the D2D communication.

The embodiments herein for handling D2D, communication between the first wireless device 121 and the second wireless device 122 may be implemented through one or more processors, such as a processor 340 in the first wireless device 121 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the first wireless device 121. One such carrier may be in the form of a CD ROM disc. It is however feasible with other data carriers such as a memory stick. The computer program code may furthermore be provided as pure program code on a server and downloaded to the first wireless device 121.

The first wireless device 121 may further comprise a memory 350 comprising one or more memory units. The memory 350 is arranged to be used to store information about which channel to use for beacon signaling, beacon response, and/or data communication. Further to store the use sequence of the available one or more second channels, data, configurations, schedulings, and applications to perform the methods herein when being executed in the first wireless device 121.

Those skilled in the art will also appreciate that the sending unit 300, the establishing unit 310, the receiving unit 320, the selecting unit 330 described above may refer to a combination of analog and digital circuits, and/or one or more processors configured with software and/or firmware, e.g. stored in a memory such as the memory 350, that when executed by the one or more processors such as the processor 340 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 4:
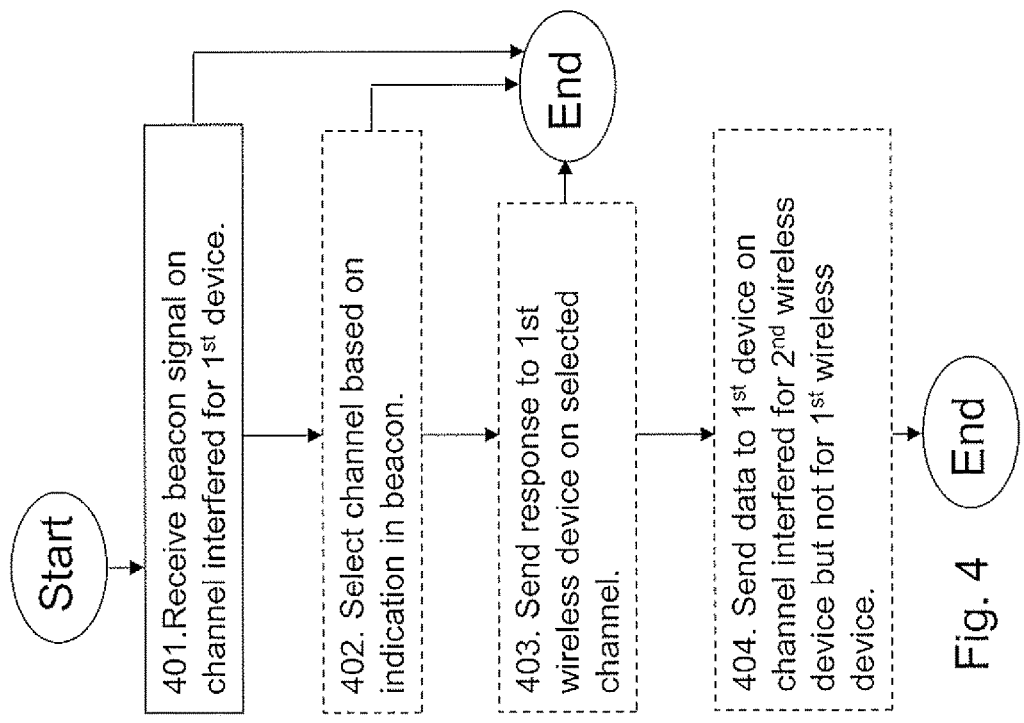
FIG. 4 is a flowchart depicting embodiments of a method in a second wireless device.

An example of embodiments of a method in the second wireless device 122 for handling D2D communication between the first wireless device 121 and the second wireless device 122, will now be described with reference to a flowchart depicted in FIG. 4. Here the method is discussed seen from the perspective of the second device 122. In an example scenario, the second wireless device 122, attempt to discover wireless devices such as the first wireless device 121 in a local range for e.g. communication or that can provide a given type of service. Therefore the second wireless device 122 listens for beacon signalling from such devices. The method comprises the following actions, which actions may be taken in any suitable order. Dashed lines of some boxes in FIG. 4 indicate that this action is not mandatory.

Action 401

The second wireless device 122 receives a beacon signal from the first wireless device 121, which beacon signal announces that the first wireless device 121 is available for D2D communication. In the example scenario there are no channels that are free from interference available for both the first wireless device 121 and the second wireless device 122 to use for sending a beacon signal on. Therefore or by other reasons, the beacon signal is received on a first channel where the first wireless device 121 is interfered. As mentioned above, to prevent the second wireless device 122 from using the interfered first channel on which the beacon was sent, for responding to the beacon signal, the beacon signal indicates that no response to the beacon signal shall be sent on the first channel.

The beacon signal may further indicate one or more second channels which are not interfered for the first wireless device 121, and which one or more second channels are available for the second wireless device 122 to respond to the first wireless device 121 sending the beacon signal.

In some embodiments, the beacon signal further indicates a use sequence of the available one or more second channels that the channels should be responded on, wherein the respective response instances in the use sequence are established based on a common time reference, between the first wireless device 121 and the second wireless device 122.

The beacon signal may further indicate one or more third channels which are interfered for the first wireless device 121, and which one or more third channels shall not be used by the second wireless device 122 for responding to the first wireless device 121 sending the beacon signal.

The alternatives and embodiments in this action may be performed as discussed under FIG. 2.

Action 402

This action is optional. The second wireless device 122 selects one or more second channel to use for responding to the beacon signal based on the indication in the received beacon signal. This may be performed as discussed under FIG. 2.

Action 403

This action is optional. The second wireless device 122 may send a response to the beacon signal to the first wireless device 121 on the one or more second channels. The one or more second channels are not interfered for the first wireless device. The response indicates that the second wireless device 122 is available for D2D communication with the first wireless device 121.

In some embodiments the response further indicates one or more fourth channels which are not interfered for the second wireless device 122. The one or more fourth channels shall be used by the first wireless device 121 to send data or control information to the second wireless device 122 during the D2D communication.

The fourth channel may be interfered for the first wireless device 121 but shall be used by the first wireless device 121 to transmit data to the second wireless device 122 during the D2D communication.

The response may indicate one or more fifth channels which are interfered for the second wireless device 122.

The alternatives and embodiments in this action may be performed as discussed under FIG. 2, Action 404

This action is optional. The second wireless device 122 may send data to the first wireless device 121 on a sixth channel that is interfered for the second wireless device 121 but not interfered for the first wireless device 121, using D2D communication. The one or more sixth channels are selected based on the indication in the beacon signal. Otherwise the second wireless device 122 may not know what channels the first wireless device 121 is not interfered on. This may be one of the second channels. So, the channel sets may overlap.

Figure 5:
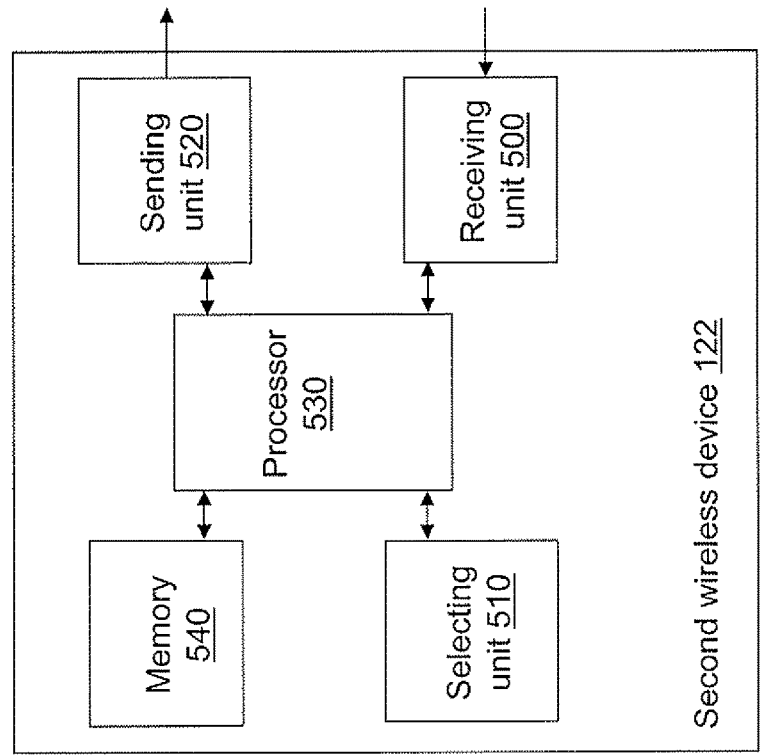
FIG. 5 is a schematic block diagram illustrating embodiments of a second wireless device.

To perform the method actions for handling D20 communication between the first wireless device 121 and the second wireless device 122 described above in relation to FIG. 4, the second wireless device 122 comprises the following arrangement depicted in FIG. 5.

The second wireless device 122 comprises a receiving unit 500 configured to receive a beacon signal from the first wireless device 121. The beacon signal announces that the first wireless device 121 is available for D2D communication. The beacon signal is received on a first channel where the first wireless device 121 is interfered. The beacon signal indicates that no response to the beacon signal shall be sent on the first channel.

In some embodiments, the beacon signal is arranged to further indicate one or more second channels which are not interfered for the first wireless device 121. The one or more second channels are available for the second wireless device 122 to respond to the first wireless device 121 sending the beacon signal.

The beacon signal may further be arranged to indicate a use sequence of the available one or more second channels that the channels should be responded on. The respective response instances in the use sequence may be established based on a common time reference between the first wireless device 121 and the second wireless device 122.

The beacon signal may further be arranged to indicate one or more third channels which are interfered for the first wireless device 121. The one or more third channels shall not be used by the second wireless device 122 far responding to the first wireless device 121 sending the beacon signal.

The second wireless device 122 may further comprise a selecting unit 510 configured to select one or more second channel to use for responding to the beacon signal based on the indication in the received beacon signal.

The second wireless device 122 may further comprise a sending unit 520 configured to send on the one or more second channels, a response to the beacon signal to the first wireless device 121. The one or more second channels are not interfered for the first wireless device. The response may indicate that the second wireless device 122 is available for D2D communication with the first wireless device 121.

The response may further be arranged to indicate one or more fourth channels which is not interfered for the second wireless device 122, and which one or more fourth channels shall be used by the first wireless device 121 to send data or control information to the second wireless device 122 during the D2D communication.

The one or more fourth channels may be interfered for the first wireless device 121 but shall be used by the first wireless device 121 to transmit data to the second wireless device 122 during the D2D communication.

In some embodiments, the response indicates one or more fifth channels which are interfered for the second wireless device 122.

The sending unit 520 may further be configured to send data or control information to the first wireless device 121 on a sixth channel that is interfered for the second wireless device 121 but not interfered for the first wireless device 121, using D2D communication. The one or more sixth channels are selected based on the indication in the beacon signal.

The embodiments herein for handling D2D communication between the first wireless device 121 and the second wireless device 122 may be implemented through one or more processors, such as a processor 530 in the second wireless device 122 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the second wireless device 122. One such carrier may be in the form of a CD ROM disc. It is however feasible with other data carriers such as a memory stick. The computer program code may furthermore be provided as pure program code on a server and downloaded to the second wireless device 122.

The second wireless device 122 may further comprise a memory 540 comprising one or more memory units. The memory 540 is arranged to be used to store which channel to use for beacon signaling, beacon response, and/or data communication. Further to store the use sequence of the available one or more second channels, data, configurations, schedulings, and applications, to perform the methods herein when being executed in the second wireless device 122.

Those skilled in the art will also appreciate that the receiving unit 500, the selecting unit 510 and the sending unit 520 described above may refer to a combination of analog and digital circuits, and/or one or more processors configured with software and/or firmware, e.g. stored in a memory such as the memory 540, that when executed by the one or more processors such as the processor 530 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 6:
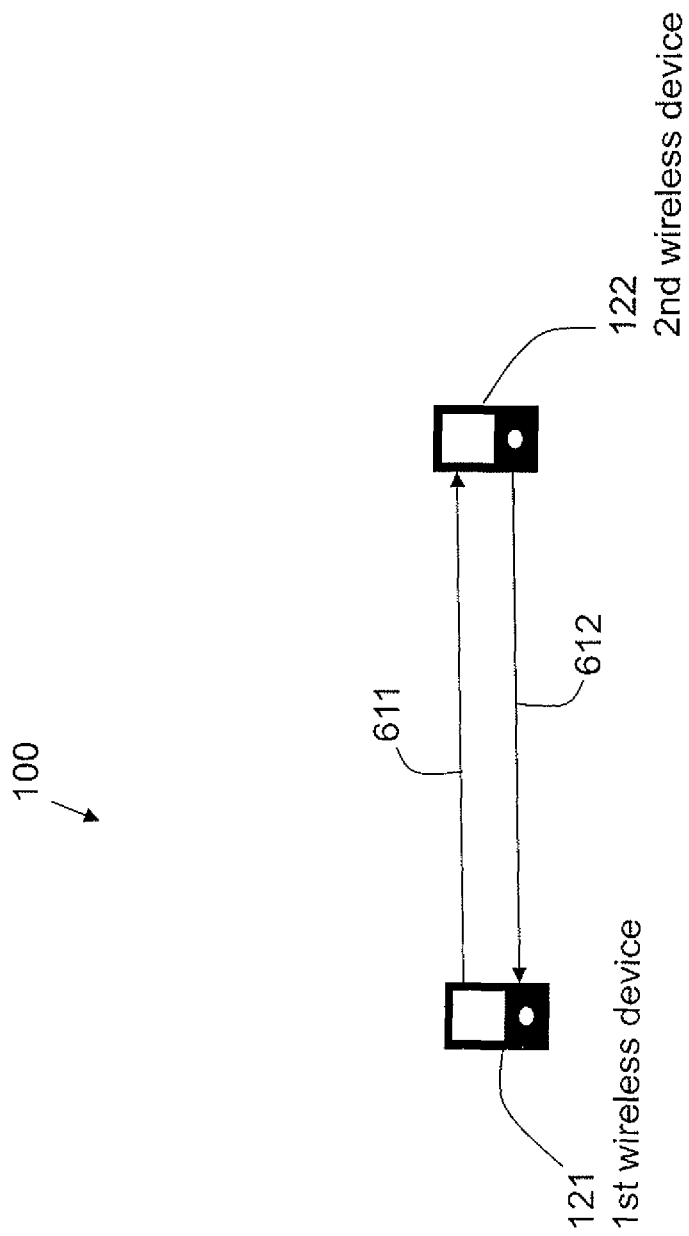
FIG. 6 is a schematic block diagram illustrating a communications network.

FIG. 6 illustrates an example scenario of a use case according to embodiments herein. The first wireless device 121 is seeing interference on a first channel 611 only. The second wireless device 122 is seeing interference on a second channel 612 only. By sending "dirty beacons", i.e. beacon signals that are sent on a channel that is interfered for the sending device but not interfered for the receiving device, the first and second wireless device 121, 122 will be able to find each other, and to set up a communication at which the first wireless device 121 transmits on the first channel 611 that it is interfered on, but not its receiver the second wireless device 122, and the second wireless device 122 transmits on the second channel 612, which it is interfered on, but not its receiver the first wireless device 121. In this illustrative example, no other channels than the first channel 611 and the second channel 612 exists.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first wireless device for handling Device to Device, D2D, communication between the first wireless device and a second wireless device the method comprising:
   detecting interference on a first channel;
   sending a beacon signal to be received by the second wireless device, which beacon signal announces that the first wireless device is available for D2D communication, which beacon signal is sent on the first channel where the first wireless device is interfered, and which beacon signal indicates that no response to the beacon signal shall be sent on the first channel.

2. The method according to claim 1, wherein the beacon signal further indicates one or more second channels which are not interfered for the first wireless device, and which one or more second channels are available for the second wireless device to respond to the first wireless device sending the beacon signal.

3. The method according to claim 2, wherein the one or more second channels are represented by a plurality of second channels, the method further comprising:
   establishing a sequence of the available one or more second channels, according to which sequence the second wireless device responds to the first wireless device sending the beacon signal, wherein the sequence is established based on a common time reference between the first wireless device and the second wireless device, and
   wherein the beacon signal further indicates the established sequence of the available plurality of second channels.

4. The method according to claim 1, wherein the beacon signal further indicates one or more third channels which are interfered for the first wireless device, and which one or more third channels shall not be used by the second wireless device for responding to the first wireless device sending the beacon signal.

5. The method according to claim 1, further comprising:
   receiving on one or more second channels, a response to the beacon signal from the second wireless device, which one or more second channels are not interfered for the first wireless device, and which response indicates that the second wireless device is available for D2D communication with the first wireless device.

6. The method according to claim 5, wherein the response further indicates one or more fourth channels which are not interfered for the second wireless device, and which one or more fourth channels shall be used by the first wireless device to send data or control information to the second wireless device during the D2D communication.

7. The method according to claim 5, wherein the response indicates one or more fifth channels which are interfered for the second wireless device.

8. A method in a second wireless device for handling Device to Device, D2D, communication between a first wireless device and the second wireless device, the method comprising:
receiving, a beacon signal from the first wireless device, which beacon signal announces that the first wireless device is available for D2D communication, which beacon signal is received on a first channel where the first wireless device is interfered, and which beacon signal indicates that no response to the beacon signal shall be sent on the first channel.

9. The method according to claim 8, wherein the beacon signal further indicates one or more second channels which are not interfered for the first wireless device, and which one or more second channels are available for the second wireless device to respond to the first wireless device sending the beacon signal.

10. The method according to claim 8, wherein the one or more second channels are represented by a plurality of second channels and wherein the beacon signal further indicates a sequence of the available one or more second channels, according to which sequence the second wireless device responds to the first wireless device sending the beacon signal, wherein the sequence is based on a common time reference between the first wireless device and the second wireless device.

11. The method according to claim 8, wherein the beacon signal further indicates one or more third channels which are interfered for the first wireless device, and which one or more third channels shall not be used by the second wireless device for responding to the first wireless device sending the beacon signal.

12. The method according to claim 8, further comprising:
selecting one or more second channel to use for responding to the beacon signal based on the indication in the received beacon signal.

13. The method according to claim 8, wherein the response further indicates one or more fourth channels which are not interfered for the second wireless device, and which one or more fourth channels shall be used by the first wireless device to send data or control information to the second wireless device during the D2D communication.

14. The method according to claim 13, wherein the fourth channel is interfered for the first wireless device but shall be used by the first wireless device to transmit data to the second wireless device during the D2D communication.

15. The method according to claim 12, wherein the response indicates one or more fifth channels which are interfered for the second wireless device.

16. The method according to claim 8, further comprising:
sending data to the first wireless device on one or more sixth channel that is interfered for the second wireless device but not interfered for the first wireless device, using D2D communication, which one or more sixth channels are selected based on the indication in the beacon signal.

17. A first wireless device for handling Device to Device, D2D, communication between the first wireless device and a second wireless device, the first wireless device comprising:
a receiving unit configured to receive wireless communications and that detects interference on a first channel; and
a sending unit configured to send a beacon signal to be received by the second wireless device, which beacon signal announces that the first wireless device is available for D2D communication, which beacon signal is sent on the first channel where the first wireless device is interfered, and which beacon signal indicates that no response to the beacon signal shall be sent on the first channel.

18. The first wireless device according to claim 17, wherein the beacon signal further indicates one or more second channels which are not interfered for the first wireless device, and which one or more second channels are available for the second wireless device to respond to the first wireless device sending the beacon signal.

19. The first wireless device according to claim 18, wherein the one or more second channels are represented by a plurality of second channels, the first wireless device further comprising:
an establishing unit configured to establish a sequence of the available one or more second channels, according to which sequence the second wireless device responds to the first wireless device sending the beacon signal, wherein the sequence is established based on a common time reference between the first wireless device and the second wireless device, and
wherein the beacon signal further indicates the established sequence of the available plurality of second channels.

20. The first wireless device according to claim 19, wherein the beacon signal further is arranged to indicate one or more third channels which are interfered for the first wireless device, and which one or more third channels shall not be used by the second wireless device for responding to the first wireless device sending the beacon signal.

21. The first wireless device according to claim 18, wherein the receiving unit is configured to receive on one or more second channels, a response to the beacon signal from the second wireless device, which one or more second channels are not interfered for the first wireless device, and which response indicates that the second wireless device is available for D2D communication with the first wireless device.

22. The first wireless device according to claim 21, wherein the response further is arranged to indicate one or more fourth channels which are not interfered for the second wireless device, and which one or more fourth channels shall be used by the first wireless device to send data or control information to the second wireless device during the D2D communication.

23. The first wireless device according to claim 21, wherein the response is arranged to indicate one or more fifth channels which are interfered for the second wireless device.

24. A second wireless device for handling Device to Device, D2D, communication between a first wireless device and the second wireless device, the second wireless device comprising:
a receiving unit configured to receive a beacon signal from the first wireless device, which beacon signal announces that the first wireless device is available for D2D communication, which beacon signal is received on a first channel where the first wireless device is interfered, and which beacon signal indicates that no response to the beacon signal shall be sent on the first channel; and
a sending unit configured to send wireless communications.

25. The second wireless device according to claim 24, wherein the beacon signal is arranged to further indicate one or more second channels which are not interfered for the first wireless device, and which one or more second channels are available for the second wireless device to respond to the first wireless device sending the beacon signal.

26. The second wireless device according to claim 25, wherein the one or more second channels are represented by a plurality of second channels and wherein the beacon signal further is arranged to indicates a sequence of the available one or more second channels, according to which sequence the second wireless device responds to the first wireless device sending the beacon signal, wherein the sequence is based on a common time reference between the first wireless device and the second wireless device.

27. The second wireless device according to claim 24, wherein the beacon signal further is arranged to indicate one or more third channels which are interfered for the first wireless device, and which one or more third channels shall not be used by the second wireless device for responding to the first wireless device sending the beacon signal.

28. The second wireless device according to claim 24, further comprising:
a selecting unit configured to select one or more second channel to use for responding to the beacon signal based on the indication in the received beacon signal.

29. The second wireless device according to claim 28, wherein the response further is arranged to indicate one or more fourth channels which is not interfered for the second wireless device, and which one or more fourth channels shall be used by the first wireless device to send data or control information to the second wireless device during the D2D communication.

30. The second wireless device according to claim 29, wherein the fourth channel is interfered for the first wireless device but shall be used by the first wireless device to transmit data to the second wireless device during the D2D communication.

31. The second wireless device according to claim 30, wherein the response indicates one or more fifth channels which are interfered for the second wireless device.

32. The second wireless device according to claim 24, wherein the sending unit configured to send data or control information to the first wireless device on one or more sixth channel that is interfered for the second wireless device but not interfered for the first wireless device, using D2D communication, which one or more sixth channels are selected based on the indication in the beacon signal.

* * * * *